United States Patent
Paviglianiti et al.

(10) Patent No.: US 11,578,875 B2
(45) Date of Patent: Feb. 14, 2023

(54) ELECTRICAL HOUSEHOLD SYSTEM AND METHOD OF CONTROLLING AN ELECTRICAL HOUSEHOLD SYSTEM

(71) Applicant: WHIRLPOOL CORPORATION, Benton Harbor, MI (US)

(72) Inventors: Gaetano Paviglianiti, Frazione Cassinetta (IT); Marco Signa, Frazione Cassinetta (IT); Cecilia Szalay, Frazione Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 169 days.

(21) Appl. No.: 16/381,143

(22) Filed: Apr. 11, 2019

(65) Prior Publication Data

US 2019/0316785 A1    Oct. 17, 2019

(30) Foreign Application Priority Data

Apr. 13, 2018 (EP) .................... 18167392

(51) Int. Cl.
| | |
|---|---|
| *F24C 15/20* | (2006.01) |
| *F24C 14/02* | (2006.01) |
| *H04L 12/28* | (2006.01) |

(52) U.S. Cl.
CPC .......... *F24C 15/2021* (2013.01); *F24C 14/02* (2013.01); *F24C 15/2014* (2013.01); *H04L 12/282* (2013.01); *H04L 2012/285* (2013.01)

(58) Field of Classification Search
CPC .. F24C 14/02; F24C 15/2014; F24C 15/2021; H04L 12/282; H04L 2012/285
See application file for complete search history.

(56) References Cited

U.S. PATENT DOCUMENTS

| | | | | |
|---|---|---|---|---|
| 3,121,158 | A * | 2/1964 | Hurko ................... | F24C 14/02 |
| | | | | 219/397 |
| 3,422,809 | A * | 1/1969 | Perry ................... | F24C 14/025 |
| | | | | 126/21 A |
| 3,682,156 | A * | 8/1972 | Perl ..................... | F24C 15/2007 |
| | | | | 126/21 A |
| 4,527,542 | A * | 7/1985 | Bales .................. | F24C 15/2042 |
| | | | | 126/21 R |

(Continued)

FOREIGN PATENT DOCUMENTS

| | | |
|---|---|---|
| DE | 10057849 A1 | 6/2001 |
| EP | 1030120 A2 | 8/2000 |

(Continued)

OTHER PUBLICATIONS

European Search Report for EP181673922, dated Oct. 18, 2018.
European Search Report for EP181673914, dated Oct. 4, 2018.

*Primary Examiner* — Jorge A Pereiro
*Assistant Examiner* — Logan P Jones
(74) *Attorney, Agent, or Firm* — McGarry Bair PC

(57) ABSTRACT

A method of controlling an electrical household system, comprises: starting a pyrolysis process in an oven, wherein the oven is connected or configured to be connected in signal communication to a household range hood; starting a suction device of the household range hood as a function of a communication signal from the oven, wherein said signal is correlated to the pyrolysis process in the oven.

9 Claims, 3 Drawing Sheets

(56) References Cited

U.S. PATENT DOCUMENTS

| | | | | |
|---|---|---|---|---|
| 4,766,880 A | * | 8/1988 | von Blanquet | F24C 15/2042 126/299 D |
| 5,826,520 A | * | 10/1998 | Mainord | F23G 7/063 110/342 |
| 6,920,874 B1 | * | 7/2005 | Siegel | F24C 15/2021 126/21 A |
| 2007/0095822 A1 | * | 5/2007 | Wiseman | F24C 14/02 219/685 |
| 2007/0158335 A1 | * | 7/2007 | Mansbery | F24C 7/082 219/505 |
| 2007/0221199 A1 | * | 9/2007 | Hake | F24C 15/205 126/299 R |
| 2008/0274683 A1 | * | 11/2008 | Burdett | F24C 15/2042 454/61 |
| 2009/0061752 A1 | * | 3/2009 | Burdett | F24C 15/20 454/61 |
| 2013/0187781 A1 | * | 7/2013 | Bach | F24C 15/2064 340/584 |
| 2015/0226439 A1 | * | 8/2015 | Mikulec | A62C 3/006 99/337 |
| 2017/0119207 A1 | * | 5/2017 | Kim | G05B 15/02 |
| 2018/0253953 A1 | * | 9/2018 | Bucsa | G01J 5/089 |

FOREIGN PATENT DOCUMENTS

| | | |
|---|---|---|
| EP | 1095440 B1 | 8/2003 |
| EP | 2282126 A2 | 2/2011 |
| EP | 2894816 A1 | 7/2015 |
| EP | 3376714 A1 | 9/2018 |
| JP | 04103919 A * | 4/1992 |
| WO | 2015168243 A1 | 11/2015 |
| WO | 2018050716 A1 | 3/2018 |

* cited by examiner

ELECTRICAL HOUSEHOLD SYSTEM AND METHOD OF CONTROLLING AN ELECTRICAL HOUSEHOLD SYSTEM

CROSS REFERENCE TO RELATED APPLICATIONS

This application claims priority to European Patent Application No. 18167392.2 filed Apr. 13, 2018, which is hereby incorporated by reference in its entirety.

DESCRIPTION

Field of the Invention

The present invention relates to household appliances. The present invention relates to an electrical household system and to a method of controlling an electrical household system. In particular, the present invention relates to the control of an electrical household system during pyrolysis process of an oven of such system.

Background

Nowadays home automation, i.e. exploiting electronic technology in the household environment, is known.

By way of example, document EP1095440 a device and a method thereof for monitoring a plurality of electric users, in particular household appliances connected in a network and belonging to a same household environment.

Among household appliances, self-cleaning pyrolytic ovens are known which use high temperature to burn off leftovers from baking, without the use of any chemical agents (thermal cleaning). Self-cleaning ovens use pyrolytic decomposition to oxidize dirt.

During thermal cleaning in ovens, organic material is converted by pyrolysis and oxidation into volatile organic compounds, hydrocarbons and carbonized gas. In particular, toxic carbon monoxide and undesirable carbon dioxide are formed.

Known self-cleaning pyrolytic ovens are provided with a catalyst device for oxidation of carbon monoxide into carbon dioxide.

In this context, the Applicant realized that, if the catalyst device does not work properly, toxic carbon monoxide may be released in the ambient air.

The Applicant further realized that, even if carbon dioxide is not toxic, if large amounts are released during the pyrolytic process, this may turn to be at least annoying for people in the kitchen.

Household range hoods are also known which are provided with smoke detectors but usually these detectors works only when the hood is turned on. If the hood is switched off during pyrolytic cleaning, the detector is not able to sense fumes.

SUMMARY OF THE INVENTION

Aspects of the invention are disclosed in the following.

In accordance with an independent aspect, a method of controlling an electrical household system, comprises: starting a pyrolysis process in an oven, wherein the oven is connected (wired or wirelessly) or configured to be connected in signal communication to a household range hood; starting a suction device of the household range hood as a function of a communication signal from the oven, wherein said signal is correlated to the pyrolysis process in the oven.

In accordance with an independent aspect, an electrical household system, comprises: a household range hood comprising at least a suction device; an oven configured to perform a pyrolysis process; an electronic control unit connected or configured to be connected in signal communication to the oven and to the household range hood; wherein the electronic control unit is configured to: sense activation of the pyrolysis process in the oven or to receive a communication signal from the oven concerning the activation of the pyrolysis process; and starting the suction device of the household range hood as a function of a communication signal from the oven, wherein said signal is correlated to the pyrolysis process in the oven.

In accordance with an independent aspect, an electrical household system, comprise: a household range hood comprising at least a suction device; an oven configured to perform a pyrolysis process; wherein the electrical household system is configured to perform the method of the appended claims or of the listed aspects.

In an aspect, starting the suction device is performed substantially together with starting the pyrolysis process. The suction device starts as soon as pyrolysis is activated. In other words, the communication signal is emitted together with activation of pyrolysis and this communication signal commands switching on the suction device.

In an aspect, starting the suction device is delayed with respect to starting the pyrolysis process. The suction device starts after a time lag with respect to activation of pyrolysis.

In an aspect, it is envisaged to turn on the household range hood in a stand by status when the pyrolysis process in the oven starts and then, preferably after the time lag, starting the suction device.

In an aspect, the household range hood is turned on upon receiving the communication signal, emitted together with activation of pyrolysis, while the suction device is started afterwards, preferably after receiving a further signal.

In an aspect, starting the suction device is performed when a temperature in the oven reaches a threshold.

In an aspect, starting the suction device is performed when a temperature sensor in the oven emits a signal.

In an aspect said temperature threshold is comprised between 150° C. and 500° C., preferably of 300° C.

In an aspect, said temperature threshold is the pyrolysis temperature.

In an aspect, said temperature threshold is the maximum cooking temperature.

In an aspect, a smoke detector is connected in signal communication to the electronic control unit and configured to detect fumes, preferably CO and/or $CO_2$.

In an aspect, the smoke detector is installed on the household range hood.

In an aspect, starting the suction device is performed when a smoke detector connected to the household range hood detects a fume, preferably CO and/or $CO_2$.

In an aspect, the suction device is started at a minimum power.

In an aspect, after starting, the power of the suction device is adjusted as a function of other parameters, preferably of smoke detection operated through a smoke detector connected to the household range hood.

In an aspect, the power of the suction device is increased, with respect to the minimum, when the smoke detector detects a fume, preferably CO and/or $CO_2$.

In an aspect, the electronic control unit is configured to start the pyrolysis process in the oven.

In an aspect, the electronic control unit is configured to be programmed to schedule pyrolysis processes in the oven.

In an aspect, the electronic control unit comprises input devices and output devices (e.g. screen, touchscreen, buttons, keyboard, mouse, etc.) to allow a user to perform programming step/s and/or to command at least the oven.

In an aspect, programming operations comprises: enabling synchronization between the oven and the range hood in order to automatically starting the suction device as a function of starting the pyrolysis process.

In an aspect, the pyrolysis process is started through a command inputted manually through the electronic control unit.

In an aspect, the electronic control unit comprises or is connected or is configured to be connected in signal communication to a remote device.

In an aspect, the remote device is a smartphone or a tablet or a computer (e.g. laptop or desktop).

In an aspect, the step or steps of programming operations and/or to input a command are performed through an application (App) working on the electronic control unit and/or on the remote device.

In an aspect, the remote device is configured to start the pyrolysis process in the oven.

In an aspect, the electrical household system comprises a communication network, preferably a local-area communication network.

In an aspect, the household range hood and the oven are connected or configured to be connected in signal communication though the communication network.

In an aspect, the electrical household system further comprises other household appliances connected or configured to be connected in signal communication to the range hood and/or to the oven and/or to the electronic control unit and/or to the communication network.

In an aspect, the electrical household system further comprises at least one of the following household appliances: a kitchen hob, a washer, a dryer, a washer/dryer, a microwave, a dishwasher.

In an aspect, the communication network comprises a router connected or configured to be connected in signal communication to the household appliances. The router is connected or configured to be connected in signal communication with a wide area network or a global area network (cloud).

In an aspect, the communication network comprises a voice assistant device connected or configured to be connected in signal communication to the household appliances to command and program through vocal instructions which are recognized by the assistant device.

In an aspect, the application is configured to be associated to a specific appliance and/or to a specific electrical household system by reading a code (preferably a QR code) on at least one of the appliances or by inputting a code manually.

In an aspect, it is provided for registering the user and the appliances and/or the electrical household system and for associating the user and the appliance and/or electrical household system to an application and/or remote device.

In one aspect, the electronic control unit is configured to control power of the suction device as a function of detected power of the kitchen hob.

In an aspect, the electrical household system further comprises an odor sensor, preferably a VOC sensor (Volatile Organic Compound) connected in signal communication to the electronic control unit.

In one aspect, the electronic control unit is configured to control power of the suction device as a function of signals from the odor sensor.

In one aspect, at least one of the appliances, preferably the range hood, is configured to notify status or events of one or more of the other appliances of the network.

In one aspect, such event is an error or the end cycle of another appliance.

In one aspect, notification is performed through a light signal, such as a blink, or a sound signal emitted.

In one aspect, notifications are performed through the application (App).

In one aspect notification may be related to: filter status of the range hood, lamp status of the range hood.

DESCRIPTION OF DRAWINGS

The following drawings relating to aspects of the invention are provided by way of non-limiting example.

DETAILED DESCRIPTION

Figure 1:
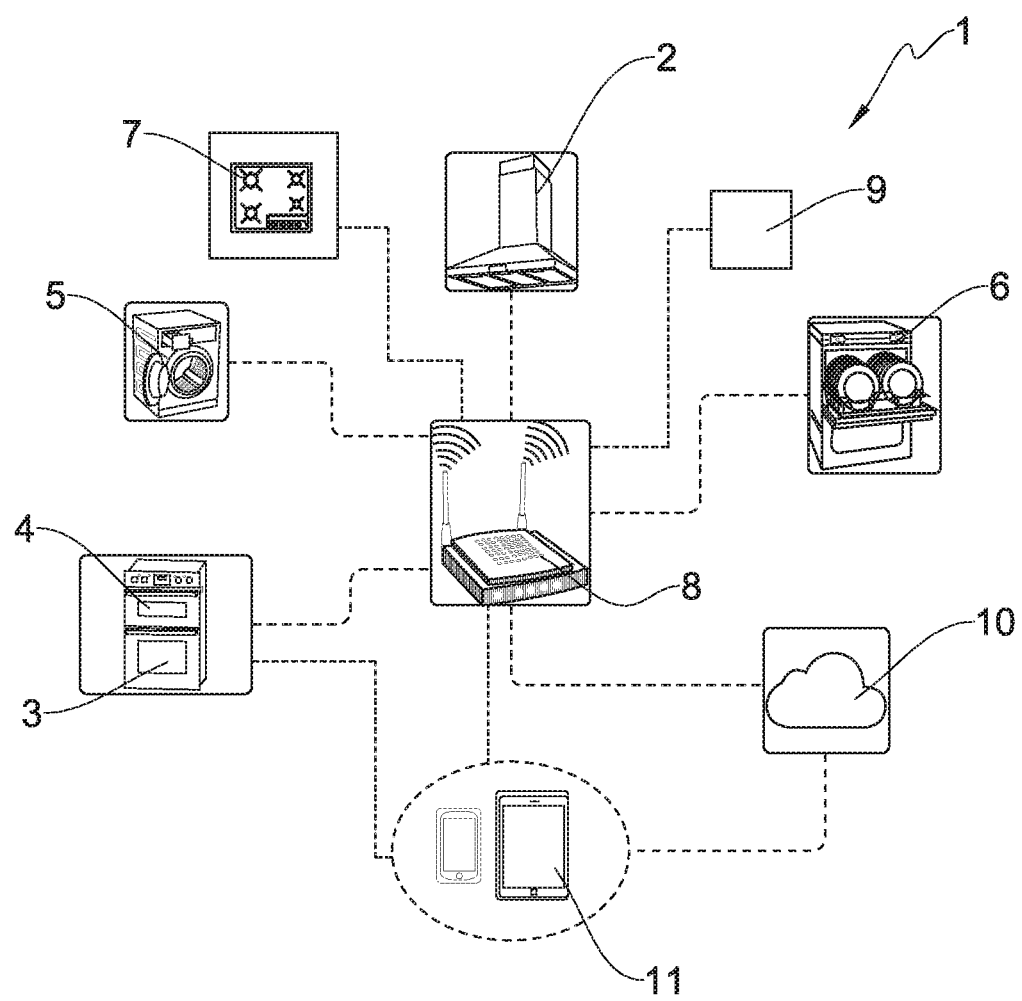
FIG. 1 shows a schematic representation of an electrical household system according to the present invention.

With reference to the appended drawings, FIG. 1 shows the architecture of an electrical household system 1 which comprises several household appliances. FIG. 1 shows a household range hood 2, an oven 3 with a microwave 4, a washer/dryer 5, a dishwasher 6, a kitchen hob 7.

The appliances are connected or are configured to be connected in signal communication to a router 8 to form a Wi-Fi local-area communication network. All the appliances are connected in signal communication to each other through the router 8 but may be also connected directly one with another (e.g. through Wi-Fi or Bluetooth).

The Wi-Fi local-area communication network further comprises a voice assistant device 9 to command and/or program the household appliances through vocal instructions (e.g for persons with reduced motor skills).

The router 8 is connected to a global-area communication network (cloud) 10 through, e.g. a mobile and fixed networks. Other types of connections may be envisaged, wired or wireless, local, wide or global.

A remote device 11, like a smartphone or a tablet or a computer (e.g. laptop or desktop), is connected or is configured to be connected to the router 8 directly and/or through the cloud 10. The remote device 11 may also be connected directly to each appliance (FIG. 1 shows e.g. the direct connection to the oven 3).

In a known way, the remote device 11 comprise/s input devices and output devices (e.g. screen, touchscreen, buttons, keyboard, mouse, etc.).

Each household appliance is provided with electronic communication devices and with a respective local electronic control unit 200 and with its own input/output devices.

An application (App) is loaded on the remote device 11 and it is configured to allow interaction with the household appliances directly and/or through the local-area communication network and/or through the cloud 10. In different embodiments, the application may be loaded on one or more of the local electronic control units 200.

The application allows to register a user and the household appliances and/or the electrical household system and to associate the household appliances and/or the electrical household system to the application and/or to the remote device. To this aim, code or codes of the appliances may be manually entered through the application or such code (preferably a QR code) placed on the appliance may be read through the remote device 11.

The range hood 2 comprises a suction device 100 (e.g. at least one fan with a motor) configured to draw air from the room/kitchen and one or more filters 400. The suction device 100 may be in fluid communication with an exhaust duct configured to discharge air outside the room/kitchen or may discharge filtered air again in the room/kitchen.

The range hood 2 comprises one or more light sources 300 (preferably LED), the temperature/colour of which can be preferably adjusted and which are also preferably dimmerable.

A smoke detector 500 is installed on the household range hood 2 and it is connected in signal communication with the local electronic control unit 200 of the range hood 2 and therefore to the components of the local-area communication network. The smoke detector 500 is configured to detect fumes, in particular CO and/or $CO_2$, and to send a signal when a threshold of these fumes is reached.

An odor sensor, preferably a VOC sensor (Volatile Organic Compound) is installed on the household range hood 2 and it is connected in signal communication with the local electronic control unit 200 of the range hood 2 and therefore to the components of the local-area communication network. The odor sensor is configured to detect Volatile Organic Compounds and to send a signal when a threshold of these Compounds is reached.

The range hood 2 further comprises a display and/or notification lights, a speaker or other input/output devices.

The oven 3 is a self-cleaning pyrolytic oven which uses high temperature to burn off leftovers from baking, without the use of any chemical agents.

The oven 3 comprises a power unit and heating elements configured to cook but also to perform a pyrolysis process and a temperature sensor configured to detect temperature inside the oven 3. The temperature sensor is connected in signal communication to the respective local electronic control unit 200 of the oven 3 and therefore to the components of the local-area communication network.

The oven 3 comprises also a catalyst device which is configured to oxidize carbon monoxide, deriving form pyrolysis, into carbon dioxide before discharging into the room/kitchen.

The kitchen hob 7 comprises a power unit and heating elements for cooking. The odor sensor may be installed on the kitchen hob 7 instead that on the range hood 2.

The household range hood 2, the oven 3 and the kitchen hob 7 are connected or configured to be connected in signal communication to each other though the communication network.

The local electronic control units 200 of the appliances 2, 3, 4, 5, 6, 7, of the router 8 and of the voice assistant device 9 together with the remote device 11 are part of, or form, an electronic control unit of the electrical household system 1. Form a different viewpoint, the electronic control unit of the electrical household system 1 comprises several portions which may be integrated into the appliances.

A household range hood system comprising the household range hood 2 with the local electronic control unit 200 and the remote device 11 is part of the electrical household system 1 and is also object of the present invention.

According to a method of controlling the household range hood 2, to a method of controlling the electrical household system 1 and to a use of the remote device 11 according to the invention, the application (App) is so structured and configured to allow a user to program the suction device 100 and/or the light source 300 and/or further electric loads of the range hood 2 through the remote device 11. This way it is possible to set operation modes and/or working times of the suction device 100 and/or of light source 300 during a time period.

The operation modes of the light source 300 set through the remote device may comprise: light source on, light source off, light source power level, light source temperature/colour. Furthermore, power level and/or temperature/colour may be changed and/or dimmered from a working time to another and also during a working time.

The working times set through the electronic control unit and/or the remote device may be comprised between one second and one day. The time period may be comprised between one hour and one year. It is thus possible to schedule working times (time bands or seconds, minutes or hours) during a day, during a week, during a month or during a year. Optionally, the scheduled working times can be automatically repeated, in order to match the user habits.

By way of example, the range hood 2 may be programmed such that every day (time period) the light source 300 is shut off (first operation mode) during day (first working time) and it is turned on with a warm tone (second operation mode) every night (second working time) as a courtesy light.

Figure 2:
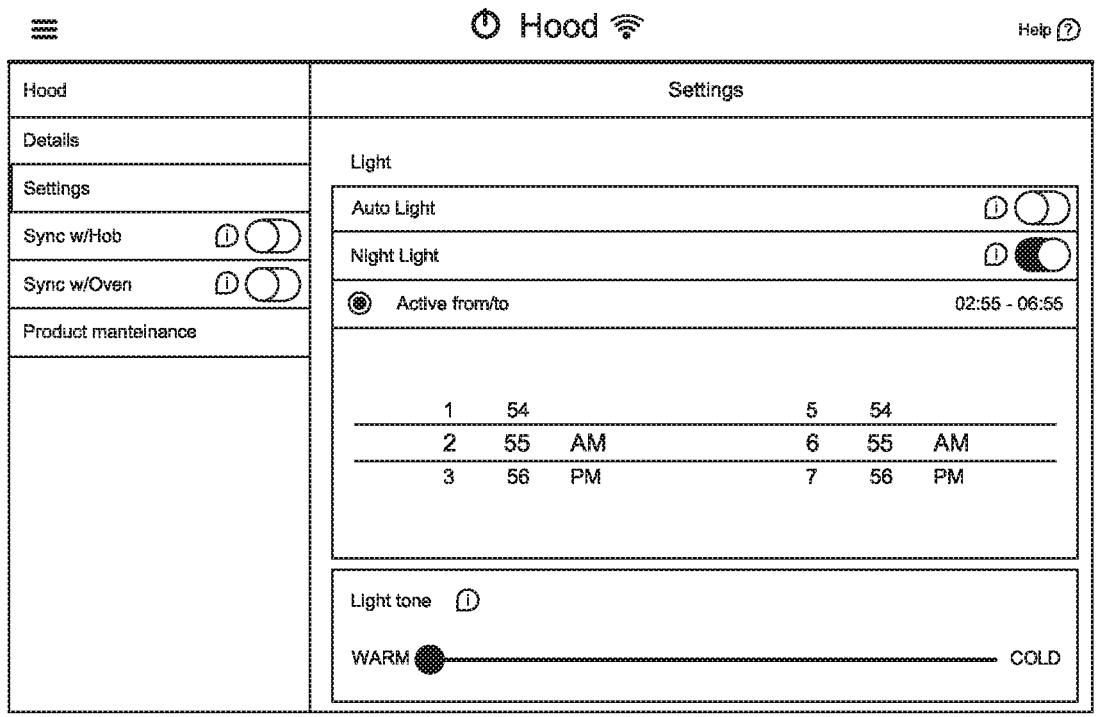
FIG. 2 shows a first screenshot of a display of a remote device associated to the electrical household system of FIG. 1.

A screenshot of the application with a programmable timer or scheduler according to the invention is shown in FIG. 2.

FIG. 2 shows that the light source 300 of the range hood 2 is programmed to be a night light with a warm tone during every night, from 2:55 AM to 6:55 AM.

The suction device 100 may be also programmed, e.g. to perform ambient air filtering and/or changing the air in the room/kitchen once in a while. By way of example, air filtering and/or changing may be performed every day at 02:00 PM and 22:00 PM just after lunch and dinner.

The programmed function may be bypassed by the manual actuation of the suction device 100 and/or of the light source 300. In other words, the electronic control unit and/or the remote device is/are configured to override the set operation modes and/or working times programmed when the user, through the input devices of the remote device 11 or of the range hood 2, switches on or off or changes the parameters of the suction device 100 and/or of the light source 300.

According to the method of controlling the household range hood 2, to the method of controlling the electrical household system 1 and to the use of the remote device 11 according to the invention, the application (App) is so structured and configured to control power of the suction device 100 as a function of parameters of the kitchen hob 7 and/or of the oven 3.

Figure 3:
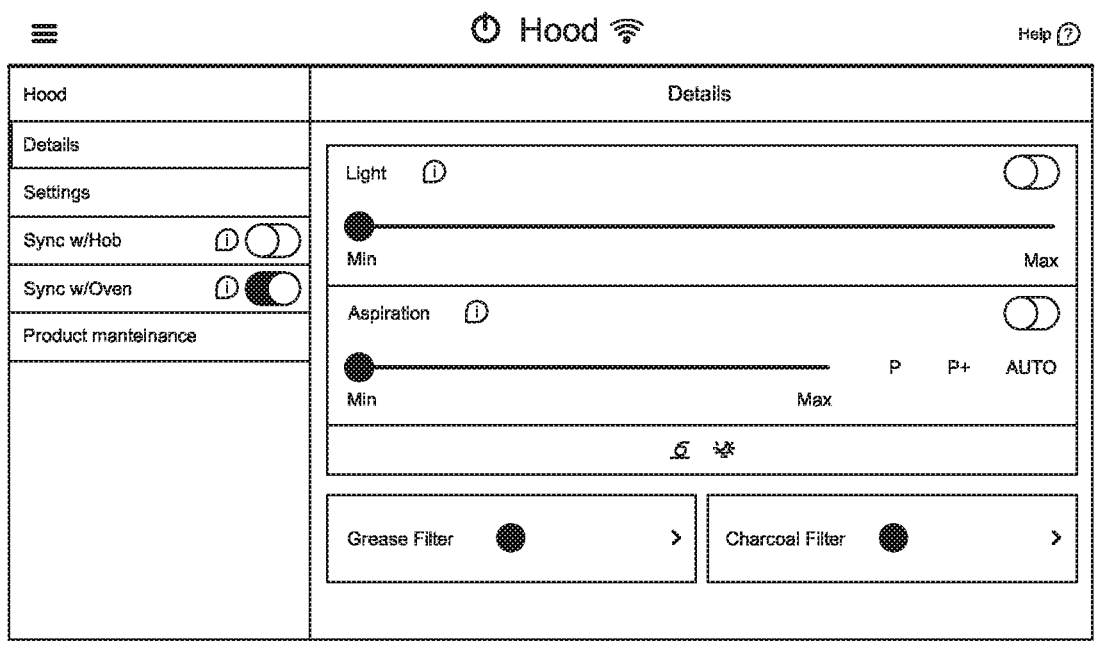
FIG. 3 shows a second screenshot of the display of FIG. 2.
Figure 4:
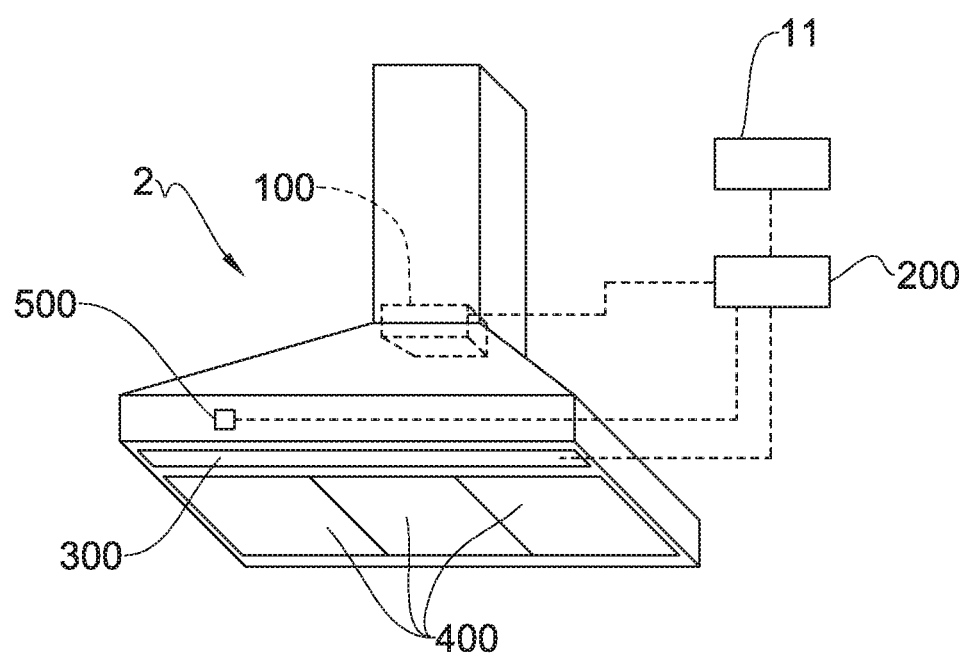
FIG. 4 shows a range hood of the electrical household system of FIG. 1.

A screenshot of the application showing synchronization buttons/sliders with the kitchen hob 7 and/or of with the oven 3 is shown in FIG. 3.

Even if the suction device 100 and/or the light source 300 of the range hood 2 are programmed to follow a scheduled program, such program is bypassed when the oven 3 and/or the kitchen hob 7 are activated (manually or automatically) in a cooking mode.

In particular, when the oven 3 and/or the kitchen hob 7 are activated in the cooking mode, the suction device 100 and preferably also the light source 300 are automatically switched on and set in a respective cooking mode (e.g. with a predefined suction power and with a specific illumination of the hob 7). Furthermore, in the cooking mode, the power of the suction device 100 may be automatically adjusted as a function of detected power of the kitchen hob 7 and/or of the oven 3 and/or of signals coming from the odor sensor.

As stated above, the oven 3 is also configured to perform a self-cleaning pyrolysis process to perform pyrolytic decomposition to oxidize dirt.

During the pyrolysis process, the temperature in the oven is raised to a pyrolytic temperature of about 350° C. to convert organic material into volatile organic compounds, hydrocarbons and carbonized gas. Carbon monoxide is oxidized into carbon dioxide by the catalyst device and expelled from the oven 3.

If the pyrolysis process of the oven 3 is programmed (through the electronic control unit and/or the remote device), the simultaneous activation of the suction device 100 may be programmed too such that volatile compounds are sucked an expelled from the room/kitchen and/or filtered to eliminate dangerous or undesired substances.

According to the invention, the synchronization of the range hood 7 with the oven 3 allows to automatically start the suction device 100 of the household range hood 7 also when the pyrolysis process of the oven 3 is started manually. The manual start is started through a command inputted manually through the electronic control unit and/or the remote device 11.

To this aim, the electronic control unit of the electrical household system 1 is configured to sense the activation of the pyrolysis process in the oven 3 and to start the suction device 100 of the household range hood 7 as a function of a communication signal from the oven 3, wherein said signal is correlated to the pyrolysis process in the oven 3.

The invention allows to remove from the room (kitchen) every possible substance deriving from pyrolysis when the pyrolysis is started manually and also in case the catalyst device of the oven does not work properly. This way, safety is greatly improved.

According to an embodiment of the invention, the suction device 100 starts as soon as pyrolysis is activated. In other words, the communication signal is emitted together with activation of pyrolysis and this communication signal commands switching on the suction device 100. There is no substantially delay between the manual activation of the pyrolysis process and the switching on of the suction device 100.

According to an embodiment, the suction device 100 starts at a minimum power as soon as pyrolysis is activated. After starting, the power of the suction device 100 is adjusted as a function of other parameters, such as smoke detection operated through the smoke detector 500 installed on the household range hood 2 (e.g. the power of the suction device 100 is increased, with respect to the minimum, when the smoke detector 500 detects CO and/or $CO_2$).

According to different embodiments of the invention, the start of the suction device 100 is delayed with respect to the start of the pyrolysis process in the oven 3. Upon receiving the communication signal, emitted together with activation of pyrolysis in the oven 3, the electronic control unit turns on the household range hood 7 in a stand by status but the suction device 100 is still and does not perform any suction. The suction device 100 starts after a time lag with respect to activation of pyrolysis.

According to an embodiment, the suction device 100 is started when the smoke detector 500 detects fumes, like CO and/or $CO_2$.

According to an embodiment, the suction device 100 is started when a temperature in the oven 3 reaches a threshold, i.e. when the temperature sensor in the oven 3 emits a signal. By way of example, the temperature sensor is calibrated to emit the signal when the temperature in the oven 3 reaches a threshold comprised between 150° and 500° C. Preferably, the temperature sensor is calibrated to emit the signal when the temperature in the oven 3 is between 300° C. (maximum cooking temperature) and 500° C., more preferably between 350° C. (the temperature from which pyrolysis approximately starts) and 500° C.

The electrical household system 1 according to the invention is configured such that signals indicating the status or an event of the other appliances (oven 3 with microwave 4, washer/dryer 5, dishwasher 6, kitchen hob 7) are emitted through the output devices of the range hood 7, which are more visible to people in the kitchen.

According to an embodiment, a light signal, such as a blink, or a sound signal is emitted by the output devices of the range hood 7 at the end of the work cycle of another appliance (such as the dishwasher 6) or when an error occurred.

According to an embodiment, a signal is emitted by the output devices of the range hood 7 indicating the filter/s and/or the lamp/s of the range hood 7 have to be replaced. These signal status may also be notified through the application (App).

It is an aspect of the present invention to improve the safety of known self-cleaning pyrolytic ovens.

It is a further aspect of the present invention to improve safety of electrical household systems provided with self-cleaning pyrolytic ovens.

It is a further aspect of the present invention to improve safety only when this is needed, i.e. during the pyrolytic process, in order to prevent unnecessary power consumption.

At least one of the above aspects is substantially achieved by correlating the operation of the oven with the operations of the range hood such that, when the cleaning pyrolysis process of the oven starts, the suction device of the range hood is automatically activated to start immediately or with a certain delay.

In particular, at least one of the above aspects is substantially achieved by a method of controlling an electrical household system and by an electrical household system according to one or more of the appended claims.

Applicant verified that the synchronization of the pyrolysis process in the oven with the operation of the suction device of the range hood allows to improve safety.

Indeed, the invention allows to remove from the room (kitchen) every possible substance deriving from pyrolysis also in case the catalyst device of the oven does not work properly. Applicant also verified that, since the suction device is activated only when pyrolysis is occurring, unnecessary power consumption is avoided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and the scope of the appended claims.

The invention claimed is:

1. An electrical household system, comprising:
a household range hood connected to another appliance through a communication network, and comprising at least a suction device;
an oven configured to perform a pyrolysis process;
a communication network, wherein the household range hood and the oven are connected or configured to be connected in signal communication through the communication network, and wherein the household range hood is connected or configured to be connected in signal communication to another appliance through the communication network;
an electronic control unit connected or configured to be connected in signal communication to the oven and to the suction device of the household range hood;
wherein the electronic control unit is configured to:
sense activation of the pyrolysis process in the oven or receive a communication signal from the oven concerning the activation of the pyrolysis process;
turn on a light source to a colour indicative of the oven running the pyrolysis process and turning the light source off upon completion of the pyrolysis process;
turn on the household range hood in a standby status without starting the suction device when the pyrolysis process in the oven starts; and
start the suction device of the household range hood after a predetermined delay, and varying a power to the suction device as a function of said communication signal; and
wherein the light source is configured to blink at the end of a work cycle of the another appliance.

2. The electrical household system of claim 1, wherein the electronic control unit is configured to start the pyrolysis process in the oven.

3. The electrical household system of claim 2, wherein the electronic control unit comprises or is connected or is configured to be connected in signal communication to a remote device; wherein the remote device is configured to start the pyrolysis process in the oven.

4. The electrical household system of claim 1, comprising a smoke detector connected in signal communication to the electronic control unit and configured to detect CO and/or $CO_2$.

5. The electrical household system of claim 4, wherein the smoke detector is installed on the household range hood.

6. The electrical household system of claim 1, wherein the electronic control unit is configured to be programmed to schedule pyrolysis processes in the oven.

7. The electrical household system of claim 1, wherein the light source is configured to have an adjustable power level based on one of a working time or function of the oven.

8. The electrical household system of claim 1, wherein the household range hood further comprises a speaker.

9. The electrical household system of claim 1, further comprising a volatile organic compound sensor in communication with the communication network and configured to detect volatile organic compounds and send a signal when a threshold is reached.

* * * * *